(12) United States Patent
Kamata

(10) Patent No.: US 10,981,140 B2
(45) Date of Patent: Apr. 20, 2021

(54) CATALYTIC REACTOR

(71) Applicant: IHI CORPORATION, Tokyo (JP)

(72) Inventor: Hiroyuki Kamata, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/580,642

(22) Filed: Sep. 24, 2019

(65) Prior Publication Data

US 2020/0047149 A1   Feb. 13, 2020

Related U.S. Application Data

(63) Continuation of application No. PCT/JP2018/013098, filed on Mar. 29, 2018.

(30) Foreign Application Priority Data

Mar. 31, 2017   (JP) .............................. JP2017-069586

(51) Int. Cl.
*B01J 19/24* (2006.01)
*B01J 35/02* (2006.01)
*B01J 19/00* (2006.01)

(52) U.S. Cl.
CPC ....... *B01J 19/2415* (2013.01); *B01J 19/0093* (2013.01); *B01J 35/023* (2013.01); *B01J 2219/0086* (2013.01)

(58) Field of Classification Search
CPC .. B01J 19/2415; B01J 19/0093; B01J 35/023; B01J 2219/0086; B01J 19/24; B01J 35/02
USPC ........................................................ 422/129
See application file for complete search history.

(56) References Cited

U.S. PATENT DOCUMENTS

| | | |
|---|---|---|
| 5,792,432 A | 8/1998 | Kato et al. |
| 6,063,342 A | 5/2000 | Kato et al. |
| 7,220,390 B2 | 5/2007 | Tonkovich et al. |
| 7,226,574 B2 | 6/2007 | Long et al. |
| 7,896,935 B2 | 3/2011 | Tonkovich et al. |
| 9,006,298 B2 * | 4/2015 | LeViness ............. B01J 37/0203 518/715 |
| 2004/0076562 A1 | 4/2004 | Manzanec et al. |
| 2004/0228781 A1 | 11/2004 | Tonkovich et al. |
| 2004/0229752 A1 | 11/2004 | Long et al. |
| 2006/0141295 A1 | 6/2006 | Sato et al. |

(Continued)

FOREIGN PATENT DOCUMENTS

| | | |
|---|---|---|
| JP | S53-008367 A | 1/1978 |
| JP | 2002-143675 A | 5/2002 |

(Continued)

OTHER PUBLICATIONS

European Patent Office, "Extended European Search Report," issued in European Patent Application No. 18 775 505.3, which is a counterpart to U.S. Appl. No. 16/580,642, dated Nov. 25, 2020, 8 pages.

(Continued)

*Primary Examiner* — Huy Tram Nguyen

(57) ABSTRACT

A catalytic reactor includes: a reaction-side flow channel in which a reaction fluid flows; a structured catalyst removably located in the reaction-side flow channel; and a protrusion formed in the structured catalyst or an inner surface of the reaction-side flow channel, having a height forming a clearance between the structured catalyst and the inner surface of the reaction-side flow channel.

5 Claims, 2 Drawing Sheets

(56) References Cited

U.S. PATENT DOCUMENTS

| | | | |
|---|---|---|---|
| 2007/0140955 | A1 | 6/2007 | Tonkovich et al. |
| 2007/0258872 | A1 | 11/2007 | West et al. |
| 2008/0148635 | A1 | 6/2008 | Bowe |
| 2009/0010823 | A1 | 1/2009 | Mazanec et al. |
| 2011/0002818 | A1 | 1/2011 | Tonkovich et al. |
| 2012/0195813 | A1 | 8/2012 | Bowe |
| 2013/0202498 | A1 | 8/2013 | Maxted et al. |
| 2014/0045954 | A1* | 2/2014 | LeViness ............. B01J 37/0205 |
| | | | 518/715 |
| 2015/0336077 | A1 | 11/2015 | Kamata et al. |
| 2016/0107138 | A1* | 4/2016 | Kamata ................ B01F 5/0082 |
| | | | 422/198 |

FOREIGN PATENT DOCUMENTS

| | | |
|---|---|---|
| JP | 2004-081949 A | 3/2004 |
| JP | 2006-015344 A | 1/2006 |
| JP | 2006-505387 A | 2/2006 |
| JP | 2006-181495 A | 7/2006 |
| JP | 2007-237044 A | 9/2007 |
| JP | 2007-244944 A | 9/2007 |
| JP | 2007-534457 A | 11/2007 |
| JP | 2014-151245 A | 8/2014 |
| JP | 2014-166603 A | 9/2014 |
| JP | 2016-097392 A | 5/2016 |
| WO | 2014/208646 A1 | 12/2014 |

OTHER PUBLICATIONS

Japan Patent Office, "Notice of Reasons for Refusal," issued in Japanese Patent Application No. 2017-069586, which is a counterpart to U.S. Appl. No. 16/580,642, dated Dec. 8, 2020, 4 pages.

* cited by examiner

CATALYTIC REACTOR

CROSS REFERENCE TO RELATED APPLICATIONS

This application is a continuation application of International Application. No. PCT/JP2018/013098, now WO2018/181652, filed on Mar. 29, 2018, which claims priority to Japanese Patent Application No. 2017-069586, filed on Mar. 31, 2017, the entire contents of which are incorporated by reference herein.

BACKGROUND

1. Technical Field

The present disclosure relates to a catalytic reactor performing catalytic reactions.

2. Description of the Related Art

A catalytic reactor includes a flow channel for a reaction fluid (hereinafter referred to as "reaction-side flow channel"), and a structured catalyst installed in the reaction-side flow channel or a catalyst carried on an inner surface of the reaction-side flow channel. When a cross section of the reaction-side flow channel is reduced while a volume of a reaction field is maintained constant in the catalytic reactor, a contact area per volume between the reaction fluid and the catalyst (i.e. specific surface area) is improved. Accordingly, it is possible to increase an efficiency of heat transmission and to improve the reaction rate and the yield.

SUMMARY

In a catalyst reactor in which a structured catalyst is installed in the reaction-side flow channel, the structured catalyst occasionally fixed firmly to an inner surface of the reaction-side flow channel due to the long-time operation. Especially, when the catalytic reaction proceeds at a high temperature or accompanied by heat generation, a firm fixation of the structured catalyst is promoted by mutual diffusions of materials of the reaction-side flow channel and the catalyst. When the structured catalyst is firmly fixed to the reaction-side flow channel, it becomes difficult to remove the structured catalyst. In this regard, a reaction-side flow channel of a catalytic reactor called as "compact reactor" or "micro reactor" has a sectional area about several $mm^2$. Therefore, a contact area of the inner surface of the reaction-side flow channel with respect to the dimensions of the structured catalyst is relatively large. Consequently, in such a catalytic reactor, it becomes more difficult to remove the structured catalyst which is firmly fixed.

In the catalytic reactor in which the structured catalyst is installed in the reaction-side flow channel, a predetermined clearance (gap) is provided between the structured catalyst and the inner surface of the reaction-side flow channel. The clearance reduces a friction between the reaction-side flow channel and the structured catalyst to facilitate the insertion and removal of the structured catalyst. This clearance is inevitably formed for the insertion and removal of the structured catalyst, but is also a space to unexpectedly allow the reaction fluid to flow without being interacted with the catalyst. That is, the clearance is one of factors degrading a reaction efficiency of the catalytic reactor.

In view of such problems, the present disclosure aims at providing a catalytic reactor that provides easy insertion and removal of a structured catalyst and does not require excessive clearance.

An aspect of the present disclosure is a catalytic reactor including: a reaction-side flow channel in which a reaction fluid flows; a structured catalyst removably located in the reaction-side flow channel; and a protrusion formed in the structured catalyst or an inner surface of the reaction-side flow channel, having a height forming a clearance between the structured catalyst and the inner surface of the reaction-side flow channel.

The protrusion may be divided into a plurality of protrusions arranged in a flow direction of the reaction fluid. The height of the protrusion may be set so that the clearance is within a range from 5% to 20% of a height of a flow space in the reaction-side flow channel.

According to the present disclosure, it is possible to provide a catalytic reactor that provides easy insertion and removal of a structured catalyst and does not require excessive clearance.

DESCRIPTION OF THE EMBODIMENTS

Figure 1:
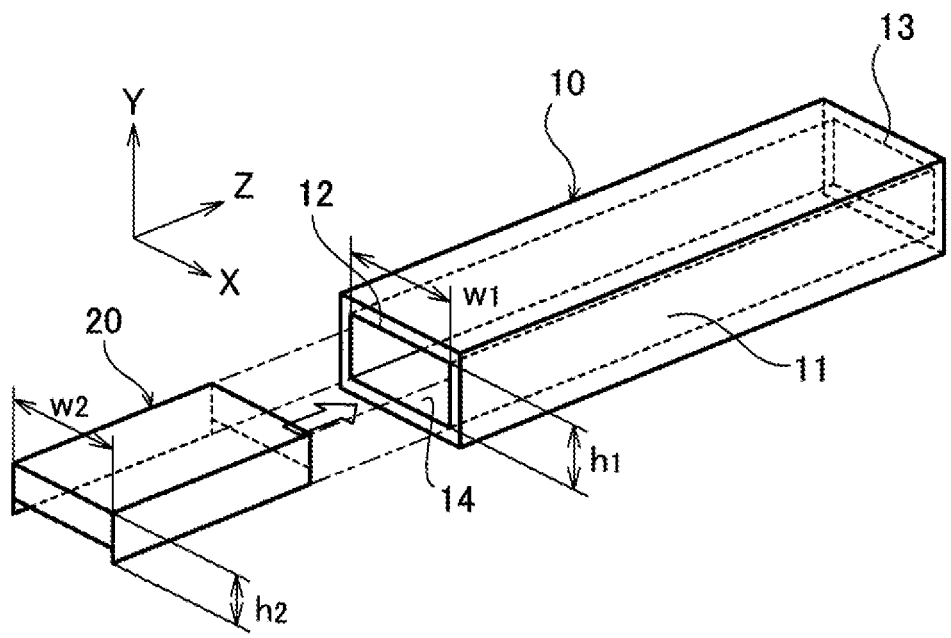
FIG. 1 is a perspective view for illustrating a catalytic reactor according to a first embodiment of the present disclosure.

A catalytic reactor according to embodiments of the present disclosure will be described below with reference to the appended drawings. The elements common to the respective drawings are indicated by the same reference numerals, and overlapping explanations are not repeated below.

FIG. 1 is a perspective view for illustrating a catalytic reactor according to a first embodiment of the present disclosure. As shown in FIG. 1, the catalytic reactor according to the present embodiment includes a reaction-side flow channel 10 and a plurality of structured catalysts 20. Note that the X, Y, and Z directions (axes) in the figure are orthogonal to each other.

The reaction-side flow channel 10 has a tubular structure, and forms a flow space 11 for a reaction fluid that is a gas or a liquid as a reaction target. The flow space 11 has a rectangular cross section orthogonal to the Z direction. As shown in FIG. 1, the flow space 11 extends in the Z direction and defines a flow direction of the reaction fluid. That is, the reaction fluid enters from an inlet 12, flows in the Z direction, and then flows out of an outlet 13. In the present embodiment, the flow space 11 has a rectangular cross section, which is orthogonal to the Z direction and has a length (height) h1 in the Y direction and a length (width) w1 in the X direction.

The material of the reaction-side flow channel 10 is a metal material. The metal material is, for example, a heat-resistant metal such as stainless steel (SUS or the like) or nickel-base alloy (e.g. Inconel (registered trademark), Hastelloy (registered trademark), Haynes (registered trademark)) or the like). The structure of the reaction-side flow channel 10 may be integrally formed of any of these materials, or may be formed by joining separated members by welding or the like.

A plurality of reaction-side flow channels 10 may be provided in parallel to each other. Further, a flow channel for a heat medium (not shown, hereinafter referred to as "heat-medium-side flow channel") may be provided adjacent to the reaction-side flow channel 10. In this case, the heat-medium-side flow channel (not shown) thermally contacts with the reaction-side flow channel 10 via, for example, a partition wall (not shown). The heat medium in the heat-medium-side flow channel (not shown) absorbs heat generated in the reaction fluid in the reaction-side flow channel 10 or releases heat to the reaction fluid in the reaction-side flow channel 10. That is, the heat-medium-side flow channel (not shown) exchanges heat with the reaction-side flow channel 10 to cool or heat the reaction-side flow channel 10 (indirectly the reaction fluid) according to the reaction of the reaction fluid.

Figure 2:
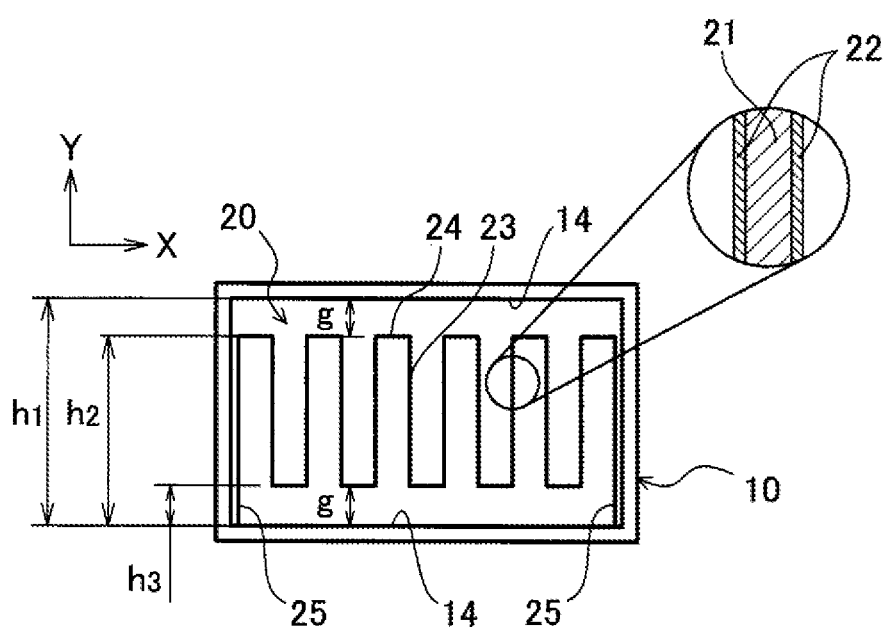
FIG. 2 is a sectional view of the catalytic reactor according to the first embodiment of the present disclosure.

FIG. 2 is a sectional view of the catalytic reactor according to the present embodiment. The structured catalysts 20 are separately formed from the reaction-side flow channel 10, and they are removably located in the reaction-side flow channel 10. Each structured catalyst 20 includes a corrugated plate on which a catalyst is carried. The structured catalyst 20 has a box-like external shape.

As similar to the flow space 11 of the reaction-side flow channel 10, an external shape of the structured catalyst 20 has a rectangular cross section which is orthogonal to the Z direction. The structured catalyst 20 has a length (height) h2 in the Y direction and a length (width) w2 in the X direction. The values h1 and w2 are respectively set smaller than the length (height) h1 in the Y direction and the length (width) w1 in the X direction to allow a slide of the structured catalyst 20 within the flow space 11, in other words, to allow an attachment and an detachment of the structured catalyst 20 with respect to the flow space 11.

The structured catalyst 20 includes a base member 21 defining the whole structure including the external shape as described above, and a catalyst layer 22 formed on the base member 21. The base member 21 includes a structure which partitions the flow space 11 into spaces extending in the Z direction. For example, as shown in FIG. 2, the base member 21 is configured of a corrugated plate undulating in the Y direction.

The base member 21 includes partitioning portions 23 partitioning the flow space 11 into the aforementioned spaces, and linking portions 24 linking between edges of the partitioning portions 23. The partitioning portions 23 and the linking portions 24 are integrally formed to constitute the corrugated plate as a whole. For example, the partitioning portions 23 are provided parallel to a Y-Z plane, the linking portions 24 are alternately positioned across the partitioning portions 23 along the X direction and links between the edges of adjacent two of the partitioning portions 23. Here, each linking portion 24 may be formed into a planar surface (see FIG. 2) or a curved surface (see FIG. 4).

As shown in FIG. 2, the structured catalyst 20 includes protrusions 25. The protrusions 25 are provided at ends of base member 21 on both sides when viewed from the extending direction of the structured catalyst 20 (i.e. the Z direction). Each protrusion 25 protrudes toward the inner surface 14 of the reaction-side flow channel 10, and extends in the Z direction. The protrusions 25 are integrally formed with the structured catalyst 20. Accordingly, the protrusions 25 are formed at least of the base member 21. Here, the catalyst layer 22 may be formed on this base member 21.

The protrusion 25 has a length (height) h3 in the Y direction, and forms clearances (gaps) g at two positions in the Y direction between the inner surface 14 of the reaction-side flow channel 10 and the structured catalyst 20. The clearances g have lengths equal to the length (height) h3. That is, the height of both ends of the structured catalyst 20 in the X direction is higher than the height of the portion other than the both ends. The length h3 is set to a value so that the structured catalyst 20 does not contact the inner surface 14 of the reaction-side flow channel 10 even when the structured catalyst 20 is warped by its own weight. Further, the length (height) h3 is also set so that the clearance g is within a range from 5% to 20% of the length (height) h1 of the flow space 11 in the Y direction. Since the clearance g has such value, it is possible to reduce the amount (the ratio) of the reaction fluid, which passes through the reaction-side flow channel 10 without contact with the structured catalyst 20 (i.e. without being interacted with the structured catalyst 20).

The material of the base member 21 is a heat-resistant alloy mainly composed of Fe (iron), Cr (chromium), Al (aluminum), Y (yttrium), for example, metal such as Fecralloy (registered trademark) or the like. A catalytic support of the catalyst layer 22 is appropriately selected depending on the reaction performed in the catalyst reactor. The catalytic support is, for example, one or more selected from the group consisting of $Al_2O_3$ (alumina), $TiO_2$ (titania), $ZrO_2$ (zirconia), $CeO_2$ (ceria), and $SiO_2$ (silica). The catalyst (active metal) of the catalyst layer 22 is appropriately selected depending on the reaction performed in the catalytic reactor. The catalyst is, for example, one or more selected from the group consisting of Ni (nickel), Co (cobalt), Fe (iron), Pt (platinum), Ru (ruthenium), Rh (rhodium), and Pd (palladium).

As described above, the protrusion 25 forms the clearances (gaps) g at two positions in the Y direction between the inner surface 14 of the reaction-side flow channel 10 and the structured catalyst 20. Further, the protrusion 25 is a plate member configured of the same material of the structured catalyst 20. Therefore, the protrusion 25 is in line contact with the inner surface 14 of the reaction-side flow channel 10. Consequently, a friction between the structured catalyst 20 and the inner surface 14 of the reaction-side flow channel 10 is reduced. Further, since the structured catalyst 20 can be prevented from being firmly fixed to the reaction-side flow channel 10, the structured catalyst 20 can be easily removed from the reaction-side flow channel 10.

The protrusion 25 separates the structured catalyst 20 from the inner surface 14 of the reaction-side flow channel 10. With this separation, the catalyst layer 22 to be in contact with the inner surface 14 is exposed to the reaction fluid. That is, the protrusion 25 can increase the contact area (contact frequency, reaction rate) between the structured catalyst 20 and the reaction fluid without excessively increasing the clearance g, thereby improving the reaction efficiency of the catalytic reactor.

Figure 3:
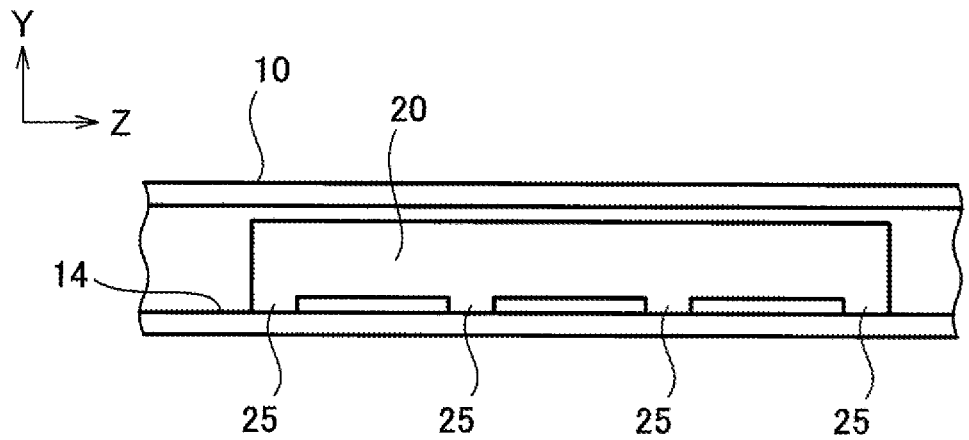
FIG. 3 is a side view of the structured catalyst according to the first embodiment of the present disclosure.

FIG. 3 is a side view of the structured catalyst 20 according to the present embodiment. As shown in FIG. 3, the protrusion 25 may be divided into a plurality of protrusions arranged in the Z direction (i.e. the flow direction of the reaction fluid or the extending direction of the structured catalyst 20). In other words, the protrusions 25 may be located at intervals in the Z direction. When the protrusion 25 is divided into the plurality of protrusions, the friction between the structured catalyst 20 and the inner surface 14 of the reaction-side flow channel 10 can be further reduced, and the structured catalyst 20 can be prevented from being firmly fixed to the reaction-side flow channel 10.

Figure 4:
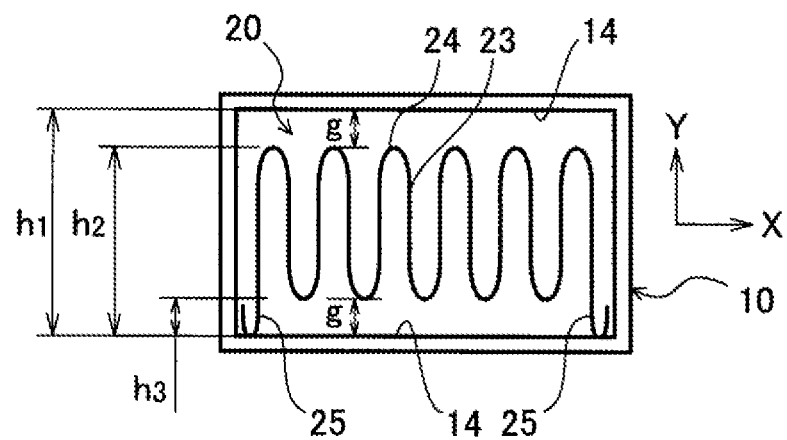
FIG. 4 is a view illustrating an exemplary modification of the structured catalyst according to the first embodiment of the present disclosure.

FIG. 4 is a view illustrating an exemplary modification of the structured catalyst 20 according to the present embodiment. As described above, the structured catalyst 20 may have the linking portion 24 formed into a curved surface. Similarly, the protrusion 25 may have a curved surface in line contact with the inner surface 14. Even when the projecting portion 25 is curved, the friction between the structured catalyst 20 and the inner surface 14 of the reaction-side flow channel 10 can be further reduced, and the structured catalyst 20 can be prevented from being firmly fixed to the reaction-side flow channel 10.

Figure 5:
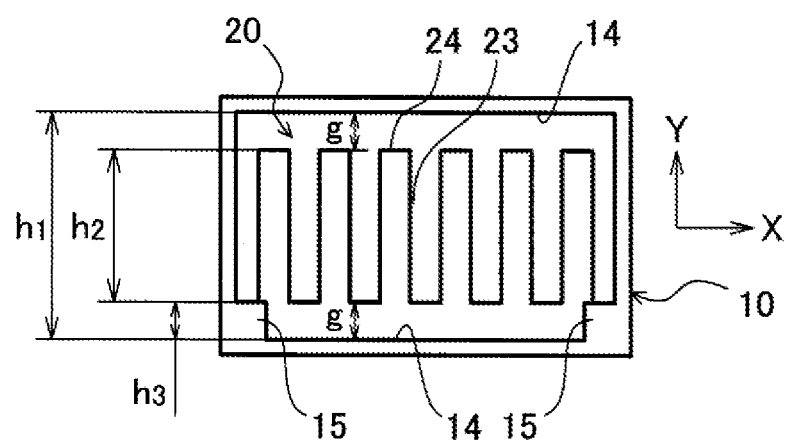
FIG. 5 is a sectional view of a catalytic reactor according to a second embodiment of the present disclosure.

FIG. 5 is a sectional view of a catalytic reactor according to a second embodiment of the present disclosure. In the second embodiment, the same components as those in the first embodiment are denoted by the same reference numbers, and the description thereof is omitted. As shown in FIG. 5, in the second embodiment, a protrusion 15 is formed in the inner surface 14 of the reaction-side flow channel 10 instead of the protrusion 25. The protrusions 15 are formed integrally with the inner surface 14 of the reaction-side flow channel 10, are located at two corners of the flow space 11 at the same height in the Y direction. The protrusion 15 protrudes toward the structured catalyst 20, and has a length (height) h3 in the Y direction as same as that of the protrusion 25 of the first embodiment. The protrusions 15 abut against both ends of the structured catalyst 20 in the X direction, and form a clearance (gap) g between the structured catalyst 20 and the inner surface 14 of the reaction-side flow channel 10. In other words, both ends of the structured catalyst 20 are placed on the protrusion 15 and are separated from the inner surface 14 by the clearance (gap) g. Same as the first embodiment, the length (height) h3 in the second embodiment is set so that the clearance g is within a range from 5% to 20% of the length (height) h1 of the flow space 11 in the Y direction.

In the second embodiment, the same effect as in the first embodiment can be obtained. That is, the end portion of the structured catalyst 20 is in line contact with the protrusion 15. Therefore, the friction between the structured catalyst 20 and the inner surface 14 of the reaction-side flow channel 10 is reduced. Moreover, since the structured catalyst 20 can be prevented from being firmly fixed to the reaction-side flow channel 10 due to heat, the structured catalyst 20 can be easily removed from the reaction-side flow channel 10. Further, That is, the protrusion 15 can increase the contact area (contact frequency, reaction rate) between the structured catalyst 20 and the reaction fluid without excessively increasing the clearance g, thereby improving the reaction efficiency of the catalytic reactor.

In addition, a slit or a hole parallel to the X-Y plane may be formed in at least one of the partitioning portion 23 and the linking portion 24. Further, the structured catalyst 20 may be divided into a plurality portions along the Z direction. In this case, the phase of the wave of each structured catalyst 20 may be shifted from each other in the X direction.

The scope of the present disclosure is not limited to the above-described embodiment, is shown by the description of claims, and further includes all modifications within the description of claims and the meaning equivalent thereto,

What is claimed is:

1. A catalytic reactor comprising:
   a reaction-side flow channel in which a reaction fluid flows;
   a structured catalyst removably located in the reaction-side flow channel; and
   a protrusion formed in the structured catalyst or an inner surface of the reaction-side flow channel,
   wherein
   the inner surface of the reaction-side flow channel includes opposing regions opposed to each other across the structured catalyst,
   the protrusion has a height forming clearances between the structured catalyst and one of the opposing regions, and between the structured catalyst and the other of the opposing regions, and
   at least one of the clearances is set equal to the height of the protrusion.

2. The catalytic reactor according to claim 1, wherein the protrusion is divided into a plurality of protrusions arranged in a flow direction of the reaction fluid.

3. The catalytic reactor according to claim 1, wherein the height of the protrusion is set so that the clearances are within a range from 5% to 20% of a height of a flow space in the reaction-side flow channel.

4. The catalytic reactor according to claim 2, wherein the height of the protrusion is set so that the clearances are within a range from 5% to 20% of a height of a flow space in the reaction-side flow channel.

5. The catalytic reactor according to claim 1, wherein the protrusion formed in the structured catalyst has a curved surface in line contact with the inner surface of the reaction-side flow channel.

\* \* \* \* \*